United States Patent
Clymans

(10) Patent No.: US 10,161,095 B2
(45) Date of Patent: *Dec. 25, 2018

(54) DEVICE AND METHOD FOR ASSEMBLING A STRUCTURE

(71) Applicant: High Wind N.V., Zwijndrecht (BE)

(72) Inventor: Etienne Clymans, Willebroek (BE)

(73) Assignee: High Wind N.V., Zwijndrecht (BE)

( * ) Notice: Subject to any disclaimer, the term of this patent is extended or adjusted under 35 U.S.C. 154(b) by 493 days.

This patent is subject to a terminal disclaimer.

(21) Appl. No.: 14/424,272

(22) PCT Filed: Aug. 30, 2013

(86) PCT No.: PCT/IB2013/058167
§ 371 (c)(1),
(2) Date: Feb. 26, 2015

(87) PCT Pub. No.: WO2014/033682
PCT Pub. Date: Mar. 6, 2014

(65) Prior Publication Data
US 2015/0219067 A1 Aug. 6, 2015

(30) Foreign Application Priority Data

| Aug. 30, 2012 | (BE) | .................................. | 2012/0565 |
| Sep. 26, 2012 | (BE) | .................................. | 2012/0639 |
| Mar. 28, 2013 | (BE) | .................................. | 2013/0216 |

(51) Int. Cl.
| *F03D 13/10* | (2016.01) |
| *E02B 17/00* | (2006.01) |
| *B66C 23/18* | (2006.01) |
| *F03D 13/25* | (2016.01) |

(52) U.S. Cl.
CPC ........ *E02B 17/0004* (2013.01); *B66C 23/185* (2013.01); *F03D 13/10* (2016.05);
(Continued)

(58) Field of Classification Search
CPC .......... F03D 1/001; F03D 13/10; F03D 13/25; B66C 23/185; Y02P 70/523;
(Continued)

(56) References Cited

U.S. PATENT DOCUMENTS

| 8,317,244 B1 | 11/2012 | Schuyleman |
| 2007/0266538 A1 | 11/2007 | Bervang |

(Continued)

FOREIGN PATENT DOCUMENTS

| DE | 29908395 U1 | 10/1999 |
| DE | 102011015881 A1 | 10/2012 |

(Continued)

OTHER PUBLICATIONS

ISR/WO (PCT/IB2013/061198) for related U.S. Appl. No. 14/653,313, dated Jun. 23, 2015.

(Continued)

*Primary Examiner* — Sarang Afzali
*Assistant Examiner* — Ruth G Hidalgo-Hernandez
(74) *Attorney, Agent, or Firm* — The Webb Law Firm

(57) ABSTRACT

The invention relates to a device for assembling a structure constructed from components, in particular a wind turbine. The device includes a lift placed on a surface for the purpose of placing a component on an available support structure, wherein a boom of the lift is provided with a main hoisting cable with a hoisting tackle for releasable attachment of the component for lifting to the boom. The boom further includes a guide device for the hoisting tackle, the guide device is connected to the boom for displacement along a longitudinal axis of the boom using a displacing device, and the guide device is configured to limit movement of the hoisting tackle in at least one direction. The invention likewise relates to a method which makes use of the invented device.

28 Claims, 13 Drawing Sheets

(52) U.S. Cl.
CPC ........ *F03D 13/25* (2016.05); *E02B 2017/006* (2013.01); *E02B 2017/0039* (2013.01); *E02B 2017/0091* (2013.01); *F05B 2230/61* (2013.01); *F05B 2240/9121* (2013.01); *F05B 2240/95* (2013.01); *Y02E 10/726* (2013.01); *Y02E 10/727* (2013.01); *Y02E 10/728* (2013.01); *Y02P 70/523* (2015.11); *Y10T 29/4932* (2015.01); *Y10T 29/53991* (2015.01)

(58) Field of Classification Search
CPC ........... Y10T 29/53991; Y10T 29/4932; E02B 2017/006; E02B 2017/0039; E02B 2017/0091; Y02E 10/728; Y02E 10/727; Y02E 10/726; F05B 2240/09
See application file for complete search history.

(56) References Cited

U.S. PATENT DOCUMENTS

| | | |
|---|---|---|
| 2008/0216301 A1 | 9/2008 | Hansen et al. |
| 2008/0307647 A1 | 12/2008 | Kessler |
| 2009/0025219 A1* | 1/2009 | Hansen .................. B66C 1/108 29/889 |
| 2011/0094987 A1 | 4/2011 | Botwright et al. |
| 2011/0123274 A1 | 5/2011 | Soe-Jensen |
| 2011/0221215 A1 | 9/2011 | Botwright |
| 2013/0125397 A1 | 5/2013 | Van den Berg |
| 2015/0368075 A1 | 12/2015 | Clymans |

FOREIGN PATENT DOCUMENTS

| | | |
|---|---|---|
| DE | 102011116189 B3 | 10/2012 |
| EP | 2364949 A1 | 9/2011 |
| WO | 2008061797 A1 | 5/2008 |
| WO | 2009041812 A1 | 4/2009 |
| WO | 2012002809 A1 | 1/2013 |

OTHER PUBLICATIONS

ISR/WO (PCT/IB2014/059069) for related U.S. Appl. No. 14/767,674, dated Apr. 23, 2014.

* cited by examiner

DEVICE AND METHOD FOR ASSEMBLING A STRUCTURE

CROSS-REFERENCE TO RELATED APPLICATIONS

This application is the United States national phase of International Application No. PCT/IB2013/058167 filed Aug. 30, 2013, and claims priority to Belgian Patent Application Nos. 2012/0565, 2012/0639, and 2013/0216 filed Aug. 30, 2012, Sep. 26, 2012, and Mar. 28, 2013, respectively, the disclosures of which are hereby incorporated in their entirety by reference.

BACKGROUND OF THE INVENTION

Field of the Invention

The invention relates to a device for assembling a structure. The invention likewise relates to a method for assembling a structure. The invention relates particularly to a device and method for assembling a wind turbine.

Although the invention will be elucidated mainly within the context of assembling a high structure such as a wind turbine at sea, the device and method according to the invention can expressly be used both on land (onshore) and at sea (offshore).

Description of Related Art

The number of high structures constructed, maintained and/or repaired on land or at sea is growing. A typical example is a wind turbine comprising a gondola (also referred to as nacelle) which is placed on a mast and forms the housing for electromechanical equipment such as a power generator. The nacelle is also provided with a hub, on which a number of rotor blades are arranged. The rotor blades convert the kinetic energy of the wind into a rotating movement of the shaft of the nacelle, which is converted into electrical energy by the power generator.

For the purpose of assembling such large structures the components are manipulated according to the prior art from a suitable surface, such as for instance a vessel, by a crane placed on the surface and placed on an already present support structure for the structure. In the case of a wind turbine the support structure can for instance comprise a mast placed on a suitable foundation.

The lifting and placing of large and heavy components is hampered by wind load. Because components such as wind turbine blades are highly susceptible to wind load, hoisted components can be exposed to great and unexpected movements relative to the support structure or relative to already installed components, this making assembly more difficult or even impossible.

SUMMARY OF THE INVENTION

An object of the present invention is to provide a device with which components of large structures, particularly wind turbines, can be assembled and placed on a support structure, in particular the mast of a wind turbine, this in a manner less susceptible to wind.

This object is achieved with a device for assembling a structure constructed from components, in particular a wind turbine, comprises a lifting means placed on a surface for the purpose of placing a component on an available support structure, wherein a boom of the lifting means is provided with a hoisting cable with attaching means, such as a hoisting tackle, for releasable attachment of the component for lifting to the boom, wherein the boom further comprises a guide device for the attaching means, the guide device is connected to the boom for displacement along a longitudinal axis of the boom by means of a displacing device, and the guide device is configured to limit movement of the attaching means in at least one direction.

According to the invention the guide device is preferably configured for coupling to the attaching means so that the movement of the attaching means is limited in at least one direction. The hoisting cable is the main hoisting cable of the lifting means.

Apart from the guide device, the lifting and placing of a component is preferably performed according to the invention by applying a per se known lifting means, in particular a crane, a boom of which is provided with a main hoisting cable provided at a free outer end thereof with an attaching means, in particular a hoisting block or hoisting tackle. Bypassing the guide device makes it possible to also use the lifting means for other purposes. if desired, the hoisting block can be suspended according to the invention from a plurality of main hoisting cables.

The lifting of a component suspended from a main hoisting cable is susceptible to wind. Making use of the guide device limits the movement of the attaching means, at least during a part of the lifting and lowering, at the moment that components are being coupled for assembly. Undesirable movements of the component are hereby also limited, and a large structure can be assembled in more efficient and safer manner. A further advantage of the invented device is that it can be realized in simple manner by providing the boom of a per se known crane with a guide device and allowing the guide device to engage on or be coupled to the hoisting block of the main hoisting cable of this crane.

A further advantage of the invented device is that it allows work to take place in highly unfavourable conditions, whereas the known device can only be deployed up to determined wind speeds. The assembly time of a structure on land or at sea can hereby be significantly reduced. The guide device can be easily displaced along the longitudinal axis of the boom, for instance away from the attaching means, whereby the lifting means can operate as a prior art lifting means. By releasing the attaching means there continues to be good accessibility from the support surface of the surface to components to be taken up by the lifting means.

In the case the device is applied for assembly at sea of a structure constructed from components, in particular a wind turbine, the surface preferably comprises a vessel, and more preferably a jack-up platform. For assembly of the structure on land the surface can optionally be formed by the ground or for instance by a bearing structure provided for the lifting means.

An embodiment of the device has the feature that the guide device is configured for coupling to the attaching means so that movement of the attaching means is limited in a direction transversely of the longitudinal axis of the boom. This direction preferably runs transversely of the lifting plane, this being the plane formed by the boom and the free-hanging main hoisting cable.

Provided in another embodiment of the invention is a device, the guide device of which is configured for coupling to the attaching means so that movement of the attaching means is limited in directions other than the direction of a longitudinal axis of the free-hanging main hoisting cable.

In order to limit the movement of the attaching means, in particular the hoisting block, it is not necessary for every movement to be prevented. The object of the present invention is also achieved if a certain movement is allowed. Provided in a preferred embodiment of the invention is a device, the guide device of which is configured for coupling to the attaching means so that movement of the attaching means, more particularly the movement of the attaching means relative to the boom of the lifting means, is limited over a predetermined distance. The distance over which the attaching means is not limited in its movement can then be set as desired. This embodiment has the advantage that the limiting distance is adjustable and is not influenced, or hardly so, by the weather and other conditions.

Although the distance can be chosen within broad limits, it is advantageous in an embodiment to characterize the device in that the predetermined distance amounts to a maximum of 20 cm, more preferably a maximum of 10 cm, and most preferably a maximum of 5 cm.

In an embodiment of the invention the guide device comprises a clamping device for the attaching means whereby movement of the attaching means relative to the guide device is substantially prevented. This embodiment has the advantage that the susceptibility of the lifting to wind is further reduced. The distance over which movement of the attaching means is still possible in this embodiment is therefore substantially zero.

There are many ways in which the attaching means can be coupled to the guide device during use. In an embodiment of the invention a device is provided wherein the guide device can be coupled to the attaching means by means of co-acting coupling means, preferably of mechanical nature.

A particularly suitable device in this respect has coupling means comprising wheels which are provided on the attaching means and on which the guide device can rest while applying little force. An alternative embodiment comprises coupling means comprising wheels which are provided on the guide device and under or between which the attaching means can push while applying little force.

Yet another embodiment comprises a device wherein the coupling means comprise cables running between the attaching means and the guide device. The freedom of movement of the attaching means can be adjusted by tightening the cables with a certain tension using winches and the like.

Another embodiment of the device according to the invention has the feature that the guide device comprises a frame of mutually connected beams, of which at least one beam and preferably two extend from the boom in the direction of the attaching means and at least partially enclose the attaching means. The at least one and preferably two beams can for instance be connected to a main beam running in transverse direction of the boom. The at least one and preferably two beams run on respectively one side and either side of the attaching means and therefore limit the movement of the attaching means in a direction transversely of the beams. This embodiment has the advantage that movements of the attaching means in other directions, for instance in a lifting direction, are substantially unimpeded.

In an embodiment the at least one and preferably two beams extend substantially perpendicularly of the longitudinal axis of the boom because in this way they cover the greatest distance from the boom. Although this distance is in principle not limited, a practical embodiment has the feature that the at least one and preferably two beams extend from the boom over a perpendicular distance of a maximum of twice the boom width. This distance preferably amounts to no more than 1.5 times the boom width. The boom width is understood to mean the transverse dimension of the boom running perpendicularly of the longitudinal axis of the boom and perpendicularly of the direction of the beams.

An embodiment of the invention is characterized in that the clamping device is formed by at least one clamping beam which is mounted on the at least one beam and which is displaceable toward the attaching means to a clamping position. This embodiment provides an operationally reliable clamping device for the attaching means. Accurate control of the clamping device is provided by an embodiment in which it comprises linear displacing means for displacing the clamping beam(s). Suitable linear displacing means comprise for instance hydraulic cylinders which are connected to an outer end of one or more yokes which are rotatable about a shaft and which are in turn attached at another outer end to a clamping beam. The yokes are rotated about their shaft by giving the hydraulic cylinders a stroke, whereby the yoke outer ends connected to the clamping beam are displaced and the clamping beam is moved toward the attaching means.

According to the invention the guide device is displaceable along the longitudinal axis of the boom by means of a displacing device. An embodiment of the device has the feature that the displacing device comprises first and second co-acting guide means provided on the guide device and the boom. In an advantageous embodiment the first guide means comprise a pair of wheels and the second guide means a T-beam, wherein the pair of wheels encloses a flange of the T-beam. This embodiment provides a smooth displacement along the boom, wherein the pair of wheels ensures that the guide device cannot come away from the boom, either in the direction of the boom or in a direction away from the boom, or in the direction transversely of the boom.

A particularly advantageous embodiment of the device has the feature that the displacing device is configured such that the guide device follows the displacement of the attaching means in the case that the attaching means is raised or lowered. This is preferably realized with an embodiment in which the displacing device comprises a tensioning cable attached to the guide device and operated by a constant tension winch so that the tensile force in the tensioning cable remains substantially constant, preferably in a manner such that the guide device rests on the attaching means while applying little vertical force. The attaching means is equipped for this purpose with a running wheel, on each side of which the guide device rests.

Another embodiment provides a device, the guide device of which comprises auxiliary devices, preferably a tugger winch with guide cable and/or a power source. This embodiment provides a guide device which can function autonomously and which need be connected if desired only to a per se known lifting means. A lifted component can be engaged and manipulated with the guide cable (tugger cable) in order to enable a still more accurate positioning thereof. The guide cable is tightened or payed out by means of the tugger winch that is present. In a practical embodiment the tugger cable is guided along a across beam connected to the frame of the guide device by means of pulleys mounted on the cross beam.

Another embodiment provides a device, the attaching means of which is connected by means of a rigid or flexible connection to an attaching structure to which a component can be releasably attached. This embodiment has the advantage that the attaching structure can be chosen subject to the component for lifting. An embodiment in which the attaching means is connected by means of a rigid connection to the attaching structure is recommended because of a more precise positioning. In an embodiment wherein the attaching means is connected to an attaching structure by means of a rigid or flexible connection, the attaching structure forms part of the attaching means.

It is further advantageous here to characterize an embodiment of the device in that the rigid connection and/or the attaching structure comprises means for displacing and/or rotating respectively the attaching structure and/or parts of the attaching structure in three dimensions. This embodiment has the advantage that, after being carried into the vicinity of the desired installation position by the lifting means, the component can be displaced and rotated about a rotation axis in precise manner in order to carry the component accurately to the installation position. In the case of for instance a wind turbine blade, this feature provides the option of mounting the blade on a hub, even when the blade mounting of the hub forms an angle other than zero with the horizontal. Precise displacements of the attaching structure enable a blade to be mounted without additional movements of the lifting means.

In an embodiment of the device according to the invention the attaching structure comprises a yoke. The yoke imparts the desired width to the attaching means during for instance lifting of a wind turbine blade, whereby tilting of the wind turbine blade is prevented. A preferred embodiment has the feature here that the attaching structure comprises a blade yoke.

A particularly advantageous embodiment of the invention provides a device, the attaching structure of which comprises a rotor blade spreader which can be oriented. The rotor blade spreader is an elongate structure with a longitudinal direction, a transverse direction and a vertical direction which in the present embodiment corresponds to the lifting direction. The spreader is provided with means for rotating the spreader round a longitudinal axis and a transverse axis and for pivoting thereof round a vertical axis, for instance by means of a motor-driven pinion. In addition, the length of the spreader in the longitudinal direction is preferably telescopically adjustable. It can thus be adjusted to the length of the engaging part of an elongate component, such as for instance a wind turbine blade. It is also advantageous for the spreader to be provided with a mechanism to enable sliding of the rotor blade in the longitudinal direction. The centre of gravity can hereby be made adjustable and the fastening bolts of a rotor blade can be pushed during assembly via a translation into the corresponding holes in the hub without additional displacement of the lifting means. The spreader is further provided with engaging means in the form of for instance gripper arms, slings, clamping mechanisms and the like to enable securing of the component.

An embodiment of the device according to the invention has the feature that the attaching structure comprises a gripper. In another embodiment the attaching structure comprises slings for the purpose of enclosing a component, in particular a wind turbine blade. The slings are placed around a cross-section of the blade and prevent damage to the paint layer and other damage to the blade.

The device according to the invention is particularly suitable for manipulating components comprising a mast, a rotor blade and/or a nacelle of a wind turbine. The invented device enables assembly of offshore wind turbines up to wind speeds of 12 m/s and more, where with the known device the mast and nacelle can be assembled up to wind speeds of 10 m/s, a complete rotor (a hub on which three blades are mounted) up to 9 m/s, a nacelle with hub and two pre-mounted blades (the so-called bunny ear method) up to about 9 m/s and individual rotor blades up to 8 m/s.

The invention likewise relates to a method for assembling a large structure, in particular a wind turbine, making use of the device according to the invention. The method comprises of providing a device according to the invention on a surface and placing the components on a present support structure using the lifting means, wherein the movement of the attaching means is temporarily limited in at least one direction by the guide device by means of displacing the displacing device along the longitudinal axis of the boom to the position of the attaching means. By making use of the device according to the invention a component, in particular a wind turbine blade, can be mounted in windy conditions on a support structure on land or at sea. The device conversely provides options for a new method of disassembling a structure on land or at sea, particularly the components of a wind turbine.

An embodiment of the invented method has the feature that the movement of the attaching means relative to the guide device is substantially prevented by clamping the attaching means in the clamping device.

Another embodiment comprises a method in which the guide device is displaced passively with a substantially constant tensile force by means of a tensioning cable attached thereto along the longitudinal axis of the boom by lifting or lowering the attaching means. The guide device rests here while applying little weight on wheels on either side of the attaching means.

A particularly suitable embodiment comprises the steps of:
  a) taking up a component with the attaching means or the attaching structure;
  b) tilting the boom upward until it runs so steeply that the attaching means comes within reach of the guide device;
  c) displacing the guide device along the longitudinal axis of the boom until it rests on the wheels of the attaching means, wherein the hoisting winch of the guide device is then switched to constant tension operation;
  d) pivoting the boom into the vicinity of the desired assembly position;
  e) fixedly clamping the attaching means with the guide device;
  f) tilting the boom until the component is in the desired assembly position;
  g) wholly or partially unclamping the attaching means; and
  h) lowering the component into the desired assembly position.

When the clamping device is active, displacements of the boom for the purpose of correcting the reach as well as lowering of the hoisting tackle for the purpose of setting down mast or nacelle are preferably limited to about 500 mm. Undesirably high; approximately horizontal forces may occur on the guide device with greater displacements because the hoisting cables of the tackle are pulled out of the vertical position. Should greater displacements nevertheless be desired, the clamping force of the guide device can be reduced such that the clamping is sufficiently great to absorb gusts of wind but is smaller than the forces occurring due to horizontal or vertical movements of more than 500 mm. This can be achieved by a partial unclamping.

In another embodiment of the method according to the invention the lowering of the component into the desired assembly position in step h) comprises of displacing and/or rotating the attaching structure and/or parts of the attaching structure in three dimensions. The component can hereby be positioned more accurately.

BRIEF DESCRIPTION OF THE DRAWINGS

The invention will now be elucidated in more detail with reference to the accompanying figures, without otherwise being limited thereto. In the figures.

DETAILED DESCRIPTION OF THE INVENTION

Figure 1A:
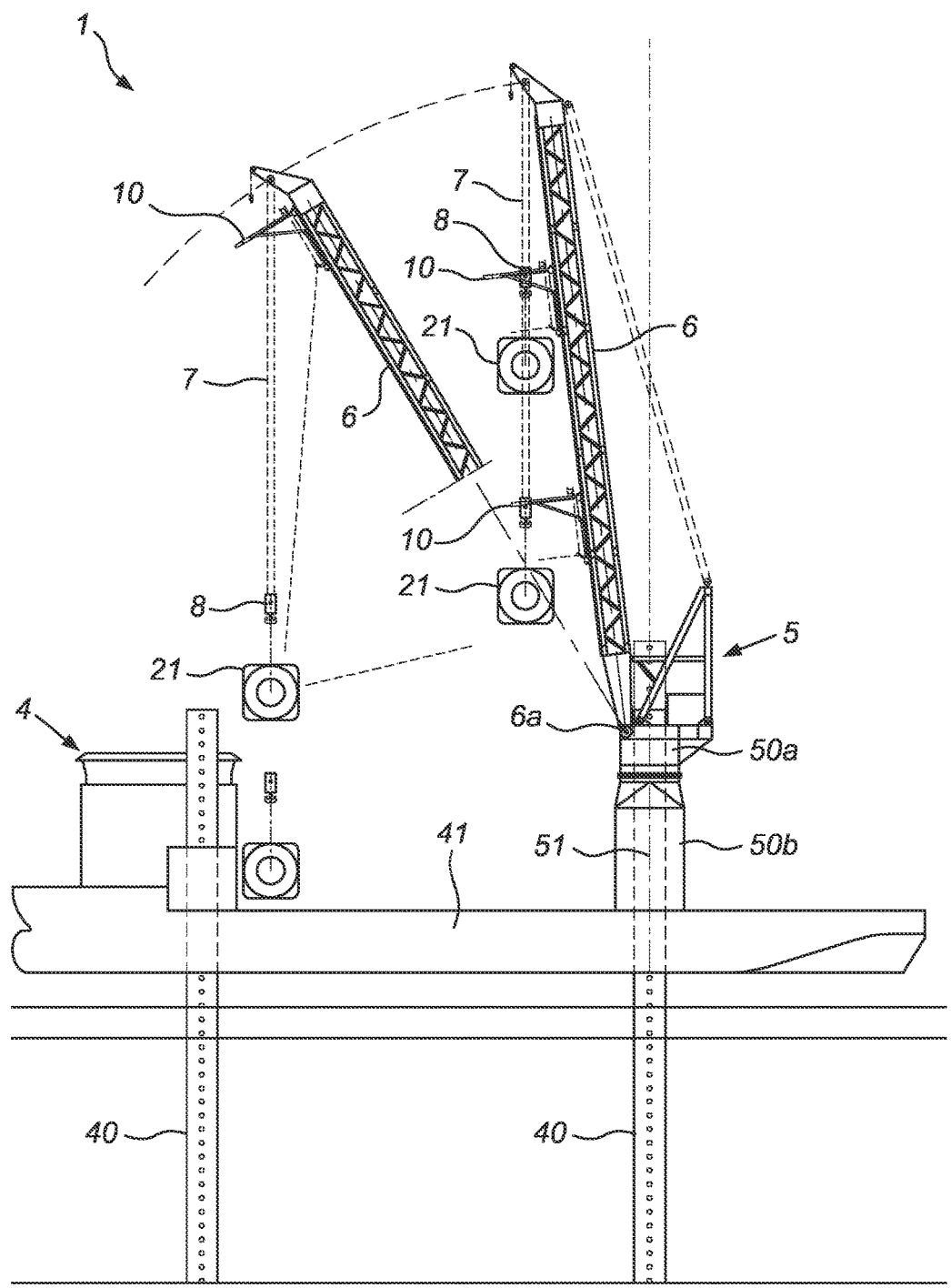
FIGS. 1A-1B show schematic side views of an embodiment of the device according to the invention in different modes.
Figure 1B:
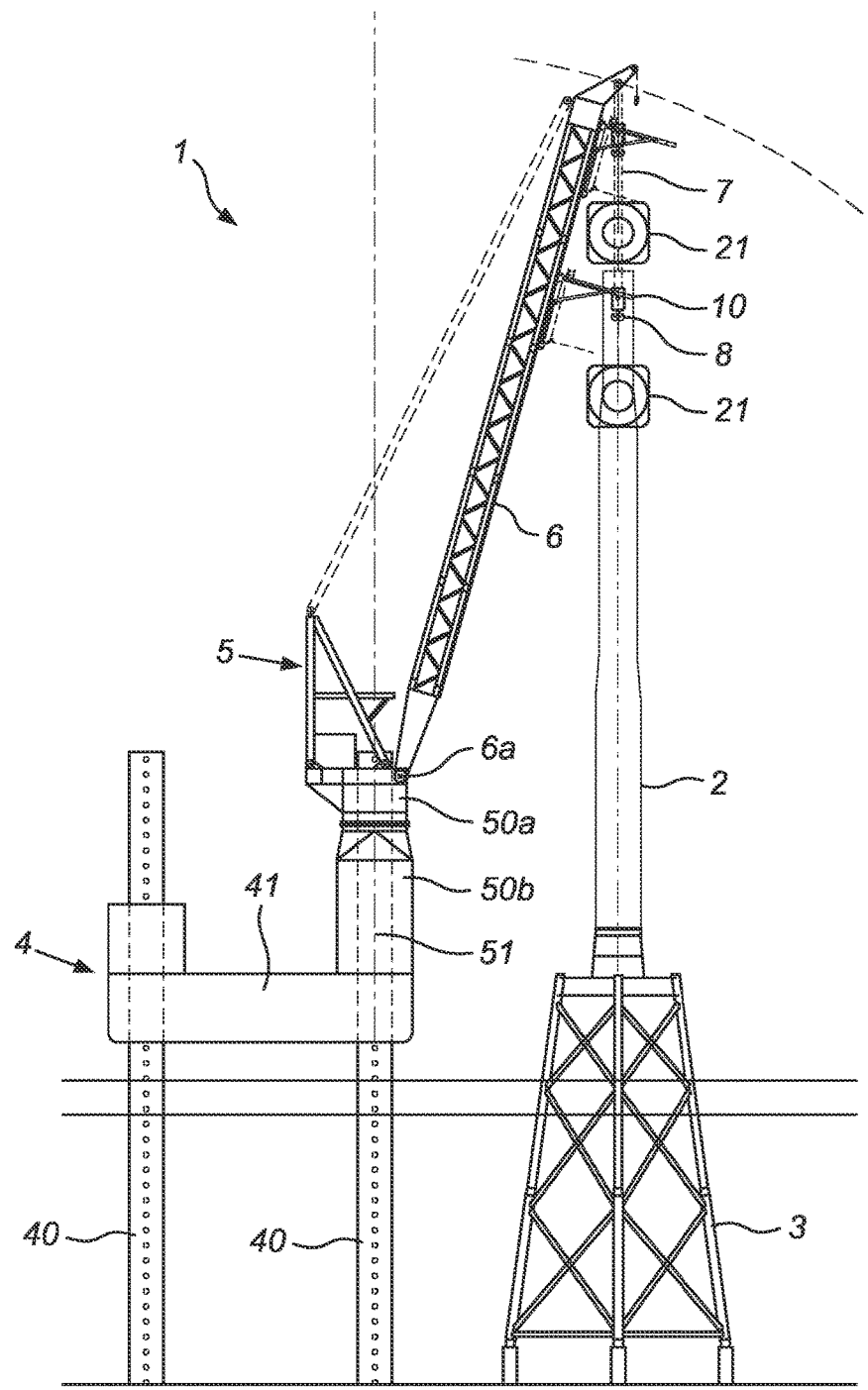

FIGS. 1A-1B show a side view of different modes of a device 1 according to the invention. The shown embodiment is configured for assembly at sea of a wind turbine on a support structure in the form of a jacket 3. It will be apparent that the invention is not limited to a support structure in the form of a jacket, and that any other foundation can be used. Driven piles (monopiles) with a so-called transition piece—a round transition structure located close to the waterline from monopile to mast mounting—can be applied in the case of for instance rather shallow water. Gravity-based foundations can also be applied in shallower water. In the case of deeper water or larger wind turbines so-called Tripods and Tripiles are also applied in addition to jackets. The components of the wind turbine to be placed comprise the wind turbine mast 2, nacelle 21, which is shown in different positions in FIGS. 1A-1B, and/or the rotor blades 22 of the wind turbine. Device 1 comprises a lifting means 5, preferably a crane, which is placed on a vessel 4 and a boom 6 of which is provided with a main hoisting cable 7 on which an attaching means such as a hoisting tackle 8 is arranged and to which a component for lifting can be releasably attached. Boom 6 is connected for pivoting around a fixed outer end 6a to a lifting means platform 50a, which is in turn rotatable round a platform foundation 50b about a rotation axis 51. Boom 6 can be luffed in, i.e. raised, and luffed out, i.e. lowered, around pivot point 6a in known manner. In FIGS. 1A-1B hoisting tackle 8 is likewise shown in different positions and the component for lifting is a nacelle 21.

Vessel 4 comprises a jack-up offshore platform provided with anchor piles 40 which support a work deck 41. Anchor piles 40 are movable in vertical direction to the seabed, and the height position of work deck 41 relative to the water level can be changed by displacing work deck 41 relative to piles 40 by means of (hydraulic) jacks or a gear rack-pinion drive system. If desired, work deck 41 is provided with storage locations for the components to be lifted and positioned. In order to enable the method according to the invention to be performed the vessel 4 is moored in the immediate vicinity of the support structure 3 available at sea, and in any case such that support structure 3 lies within reach of lifting means 5 with boom 6 in luffed-out position.

According to the invention boom 6 comprises a guide device 10 for hoisting tackle 8 with which the movement of hoisting tackle 8 can be limited in at least one direction 61. This limited direction 61 will generally be a direction running transversely of the longitudinal axis 60 of boom 6, although this is not essential. According to FIG. 2A hoisting tackle 8 generally comprises a pulley housing 80 and a hoisting hook 81. Hoisting tackle 8 is provided on both sides with wheels 80a and 80b on which guide device 10 can rest while applying little force. Because guide device 10 rests while applying relatively little weight on wheels (80a, 80b) of hoisting tackle 8, guide device 10 will follow hoisting tackle 8 in a substantially passive manner. A hoisting winch (not shown) of guide device 10 serves to absorb the relatively low weight, wherein the winch is preferably adjusted via a so-called constant tension operation mode. The greater part of the weight is absorbed by the tensile force in the hoisting cable of guide device 10. The wheels (80a, 80b) of hoisting tackle 8 ensure that this hoisting tackle 8 encounters substantially no resistance forces in longitudinal direction (the direction of beams 101a, 101b) and so remains suspended vertically under the hoisting sheaves at the top of boom 6.

Figure 2A:
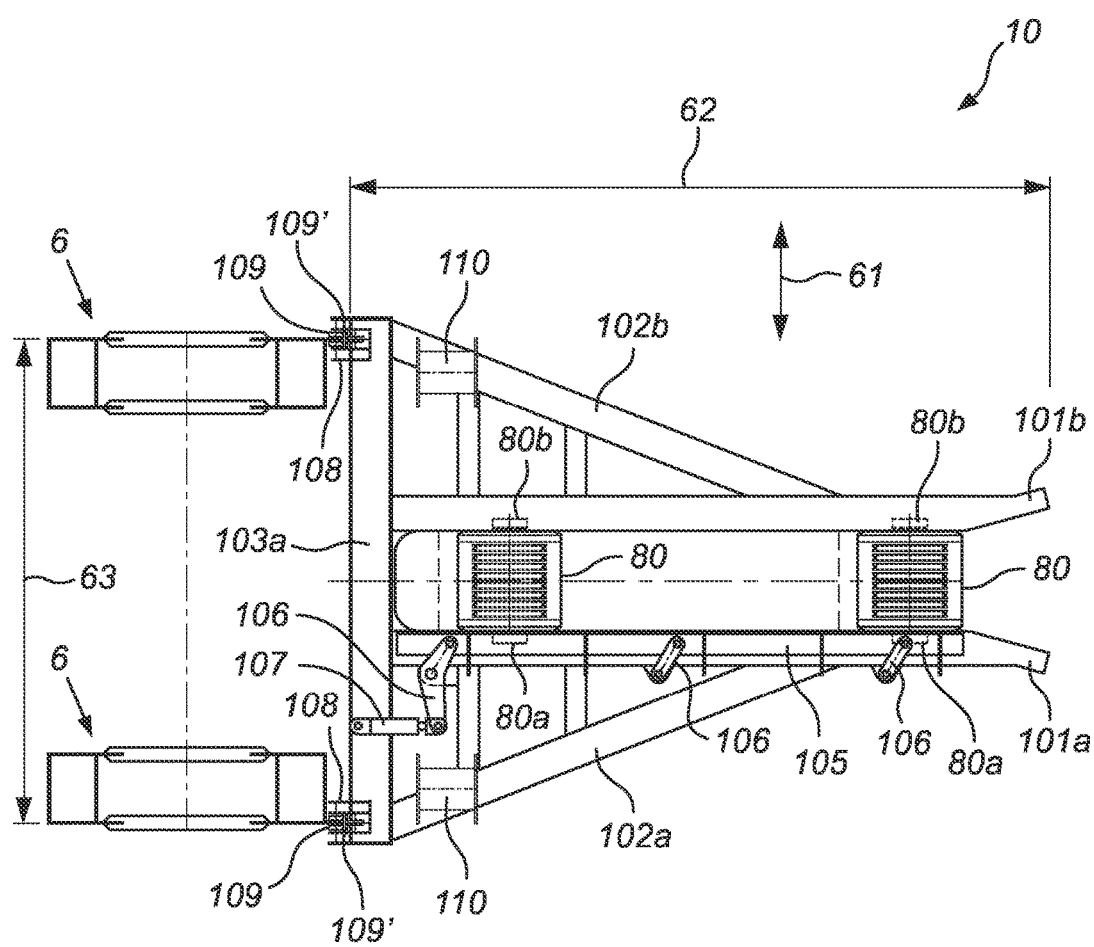
FIGS. 2A, 2B and 2C show respectively a schematic top view, side view and front view of an embodiment of a guide device according to the invention.
Figure 2B:
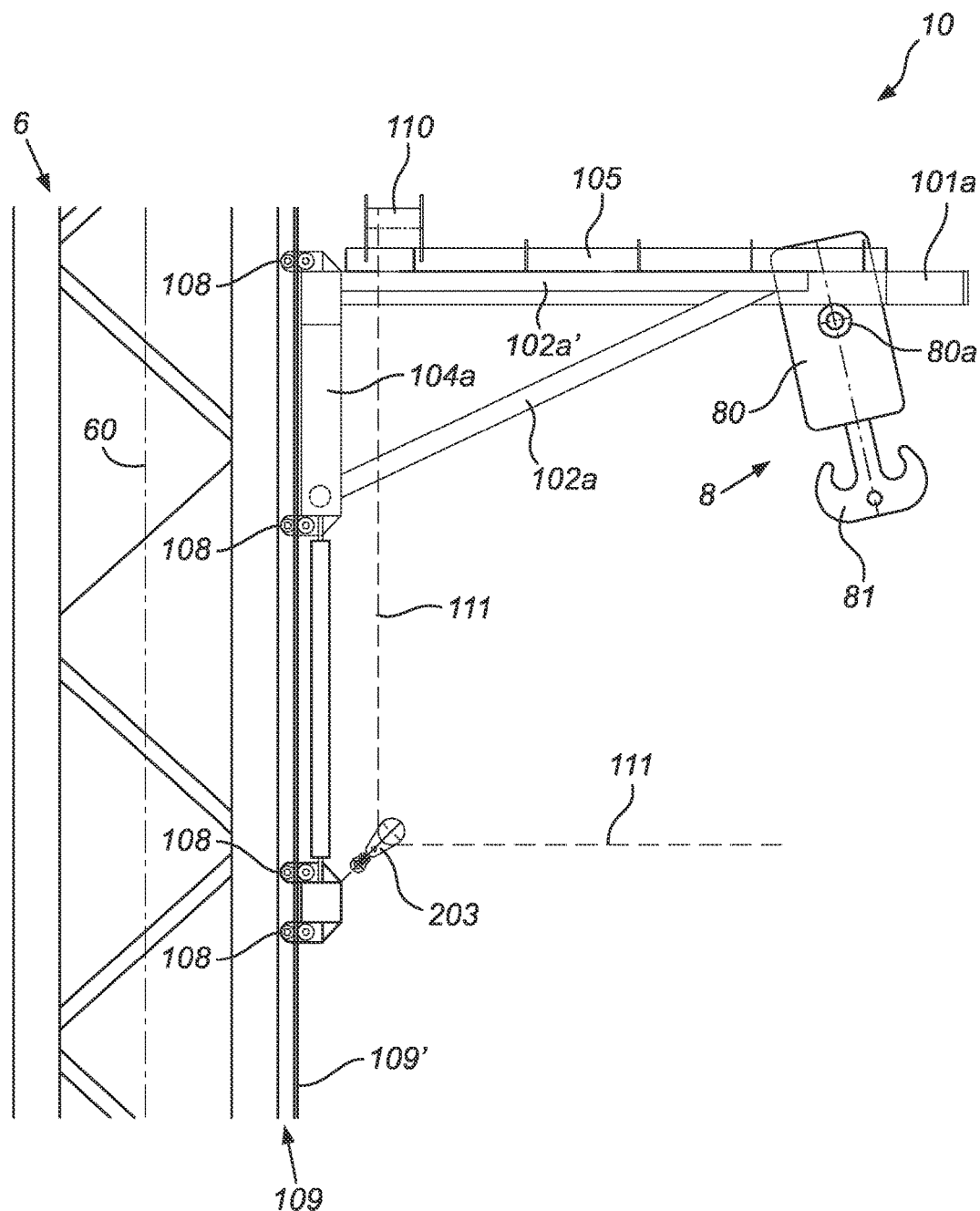
Figure 2C:
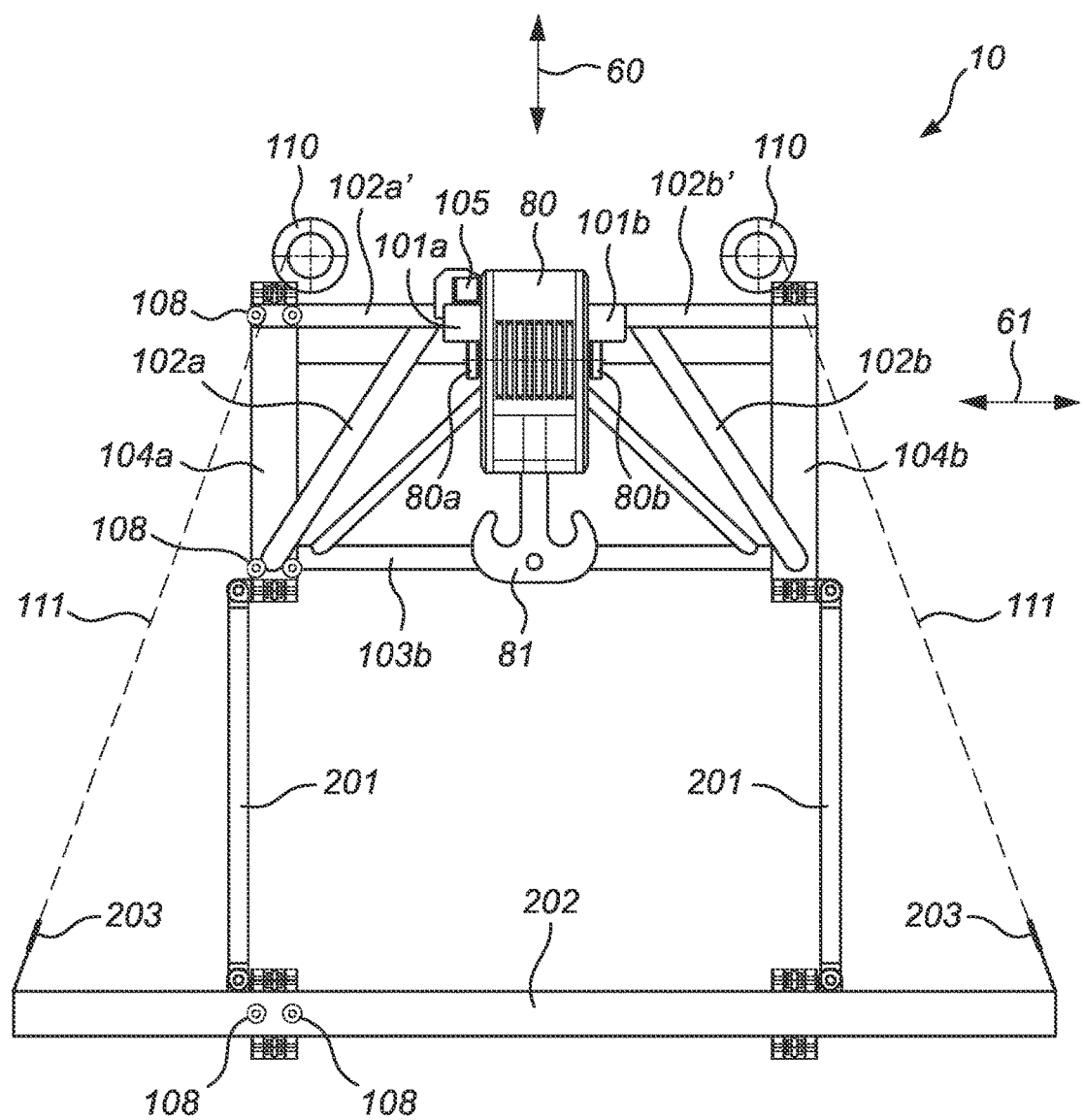

An embodiment of a guide device 10 is shown in more detail in FIGS. 2A, 2B and 2C. The shown guide device 10 comprises a frame of mutually connected beams, at least two beams (101a, 101b) of which extend from a rectangular base frame, which is formed by two transverse beams (103a, 103b) and two vertical beams (104a, 104b), from boom 6 in the direction of hoisting tackle 8, this substantially perpendicularly of the longitudinal axis 60 of boom 6. The frame is further reinforced by two inclining beams (102a, 102b) and two inclining beams (102a', 102b'). The length of the beams (101a, 101b) is such that they at least partially enclose hoisting tackle 8, and particularly pulley housing 80 thereof. The position of hoisting tackle 8 between beams (101a, 101b) depends on the degree to which the boom is luffed in and on the height of hoisting tackle 8. Because hoisting tackle 8 is suspended from main hoisting cable 7 the left-hand position A of pulley housing 80 shown in FIG. 2A will usually be reached by luffing in boom 6 such that the reach of the hoisting tackle corresponds to the centre line of foundation 3 of the turbine mast and the hoisting height of hoisting tackle 8 corresponds to the highest hoisting height required for a wind turbine component. The right-hand position B will generally be reached at the same boom position, although with a lower hoisting height required for wind turbine components, so in the case of wind turbines with shorter mast. The two beams (101a, 101b) preferably extend from boom 6 over a perpendicular distance 62 of a maximum of twice the boom width 63 in order to provide sufficient stiffness. Guide device 10 is further provided with a clamping device for hoisting tackle 8 in the form of a clamping beam 105 which is attached with yokes 106 to a beam (101a or 101b) and which is displaceable toward hoisting tackle 8 to a clamping position. The displacement of clamping beam 105 can for instance take place with the linear displacing means in the form of a hydraulic cylinder 107 which is arranged on the base frame and which controls one of the yokes 106. Pressing the clamping beam 105 clampingly against hoisting tackle 8, more particularly against pulley housing 80, with hydraulic cylinder 107 substantially prevents movement of hoisting tackle 8 relative to guide device 10. Hoisting tackle 8 is thus immobilized relative to guide device 10, and so also relative to boom 6.

In particular, the attaching means, such as the hoisting tackle 8, when contacting the guide device 10 is constrained to move only in a plane comprising the longitudinal axis of the boom 6 and a centerline of the guide device 10, while being constrained in a transverse direction perpendicular to the plane. A component connected to hoisting tackle 8 can hereby be positioned with greater precision, even in a strong wind. It is advantageous that a per se known lifting means 5 in the form of a crane with boom 6 can be deployed, and that the immobilization of the engagement with a component can be terminated at any moment.

Guide device 10 is connected to boom 6 for displacement along longitudinal axis 60 by means of a displacing device (108, 109, tensioning cable, hoisting sheave and winch). Guide device 10 and boom 6 are provided for this purpose with first and second co-acting guide means (108, 109) which, together with a tensioning cable, hoisting sheave and winch (not shown) mounted on guide device 10, form the displacing device. The first guide means comprise sets of wheels 108 arranged on the base frame (103, 104) and the second guide means comprise T-beams 109 connected to the side of boom 6 facing toward guide device 10. Each pair of wheels 108 encloses the flange of a corresponding T-beam 109, wherein wheels of a set of wheels 108 are situated on either side of the flange and roll thereover. Each set of wheels is particularly provided with a wheel which runs on flange 109' of the T-profile 109 provided on the boom box girder for the purpose of absorbing pressure forces and two running wheels running on the other side against flange 109' of T-profile 109 for the purpose of absorbing tensile forces. Also provided if desired on one side of the boom are transverse rollers running on the end surface of flange 109' of T-profile 109 in order to hold guide device 10 on the rails in transverse direction. Depending on the wheel load, wheels can optionally be replaced by double wheel bogies. It is of course possible to realize other methods of displaceability along boom 6.

The tensioning cable (not shown) attached to guide device 10 is preferably operated by a constant tension winch (not shown) so that the tensile force in the tensioning cable remains substantially constant and is kept at a generally relatively low value in the situation where the guide device is active and rests while applying little force on the wheels of hoisting tackle 8. The constant tension winch is situated for instance on boom 6, for instance on a transverse box girder in the area surrounding the hinge construction in the vicinity of hinge 6a, roughly in the centre of the boom. The hoisting sheave for the guide device is preferably situated at the upper outer end of boom 6.

Guide device 10 can be provided if desired with auxiliary devices. As shown in FIG. 2C, such an auxiliary device can comprise a tugger winch 110 and optional power sources (not shown). Running from tugger winch 110 is a guide cable 111 (tugger cable) which can be connected to a component connected to hoisting tackle 8. The component can be positioned in accurate manner by lengthening or shortening guide cable 111 using winch 110. Guide cable 111 can be connected to base frame (103, 104) in simple manner via a suspension frame (201, 202) which is connected to base frame (103, 104) and constructed from vertical beams 201 and a cross beam 202, which is likewise provided with sets of wheels 108 co-acting with T-beam 109. Cross beam 202 has sufficient length to suspend pulleys 203 from the outer ends such that the guide cables can engage roughly at a right angle on the component for lifting. This results in the most efficient guiding of the tugger system.

Figure 6:
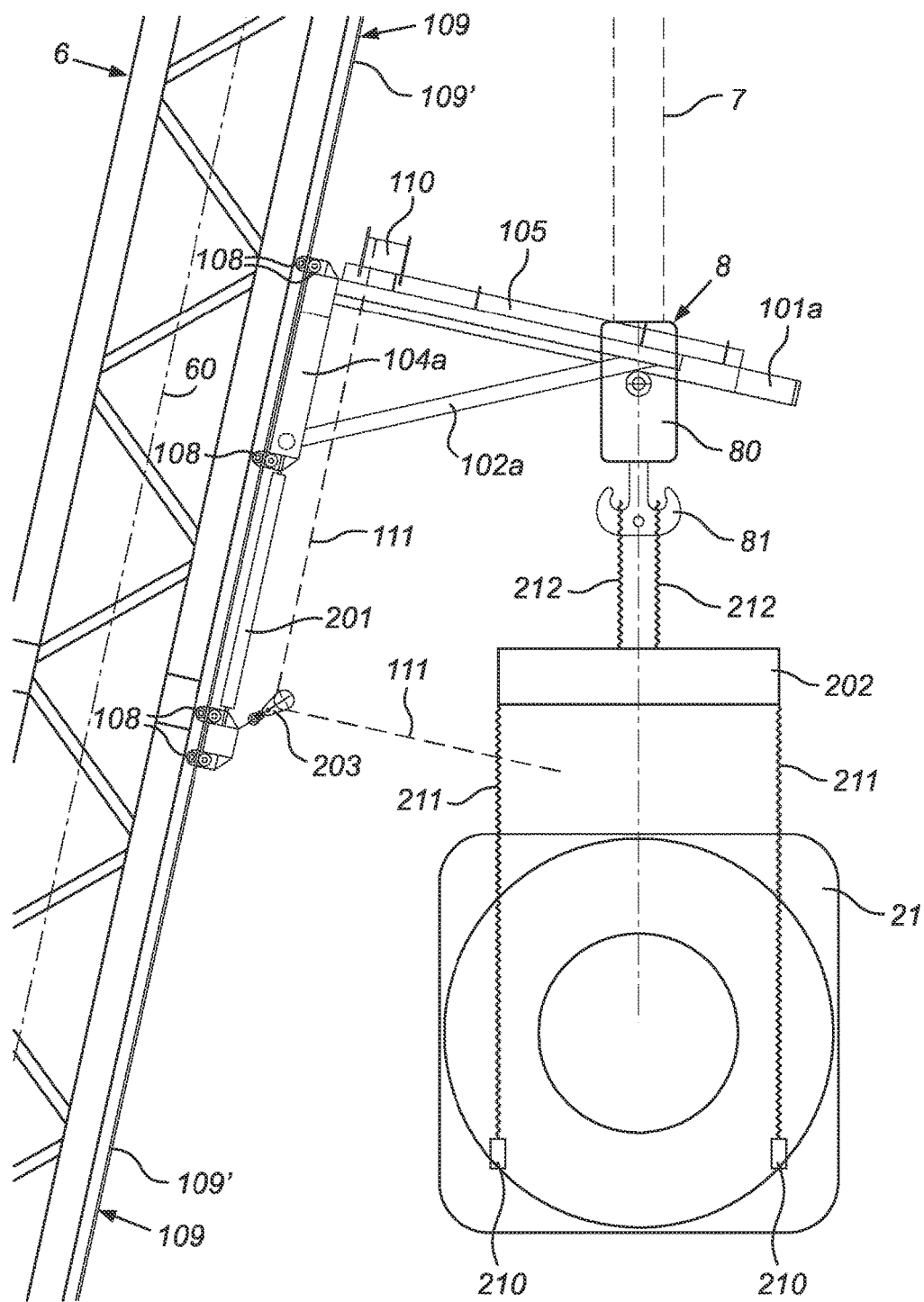
FIG. 6 shows a schematic side view of yet another embodiment of a guide device according to the invention.

As shown in FIG. 6, a nacelle 21 of a wind turbine can be taken up by a cross beam 202 which is connected by means of suspension cables 211 to lifting eyes 210 arranged on nacelle 21. Cross beam 202 is connected by means of suspension cables 212 to hoisting hook 81. By fixedly clamping hoisting tackle 80 to guide device 10 a substantially rigid connection is obtained between hoisting tackle 8 and boom 6. The movements of nacelle 21 under the influence of wind and boom movements are hereby prevented. The guide cables 111 connected to nacelle 21 enable precise control of the rotation of nacelle 21.

Figure 3A:
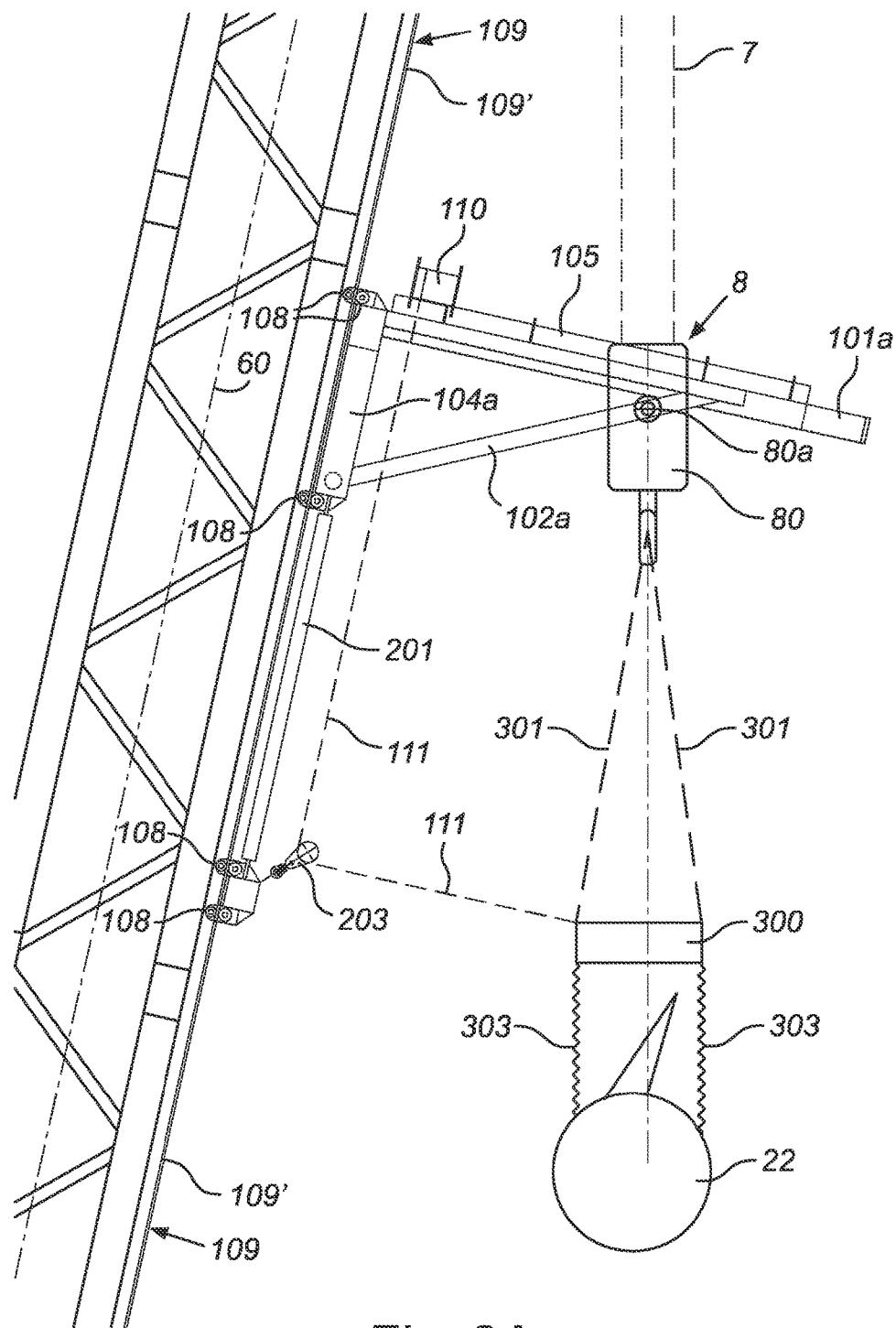
FIGS. 3A and 3B show respectively a schematic side view and front view of another embodiment of a guide device according to the invention.
Figure 3B:
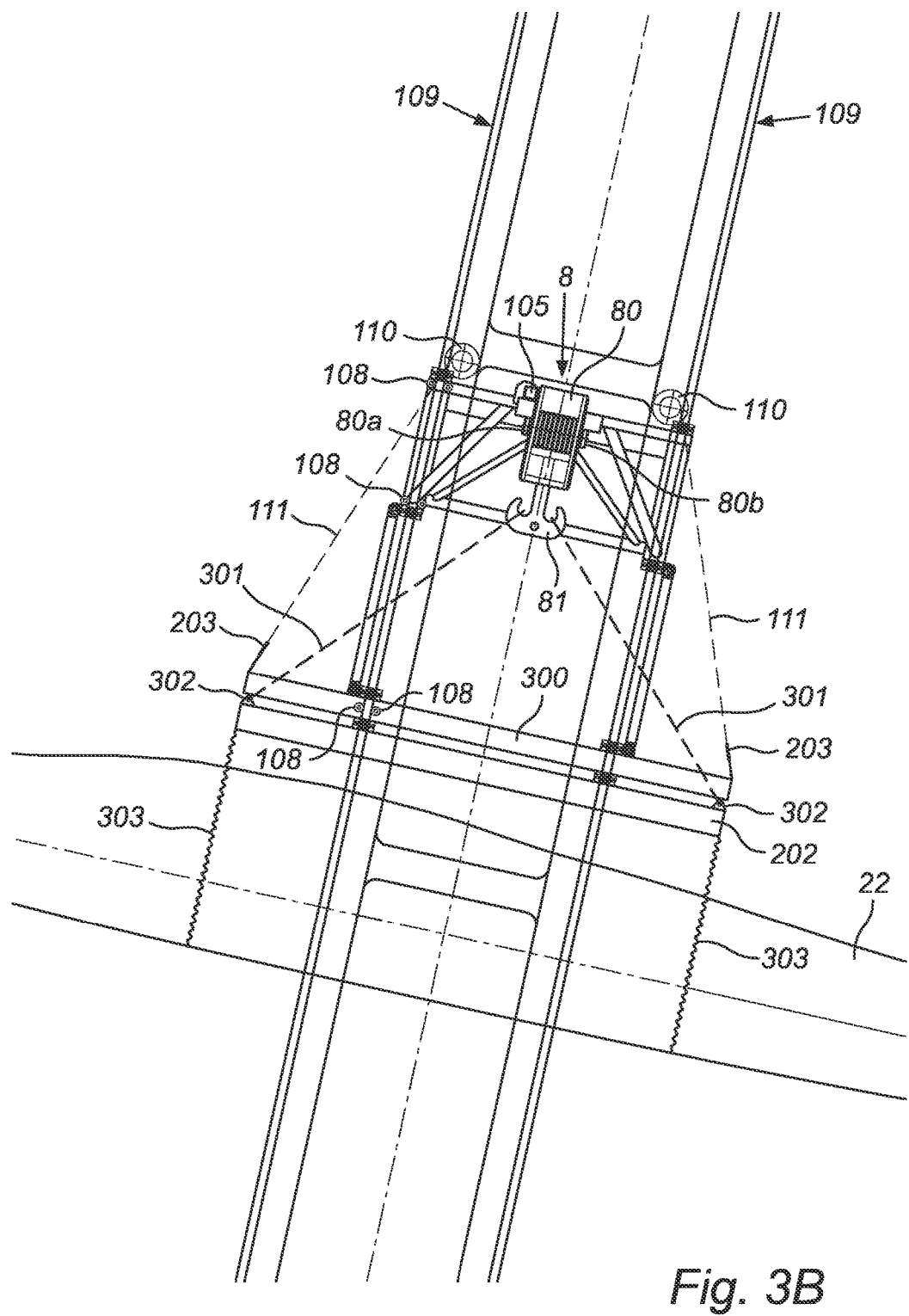

FIGS. 3A and 3B show an embodiment wherein hoisting pulley 8 is connected by means of a flexible connection to an attaching structure in the form of a hoisting yoke 300 which runs in transverse direction 61 and to which a wind turbine or rotor blade 22 is releasably attached. The flexible connection is formed by two suspension cables 301 running from lifting eye 81 to attachment points 302 arranged on hoisting yoke 300. Blade 22 lies in more or less horizontal position. Rotor blade 22 is suspended in slings 303 fastened to hoisting yoke 300.

Figure 4A:
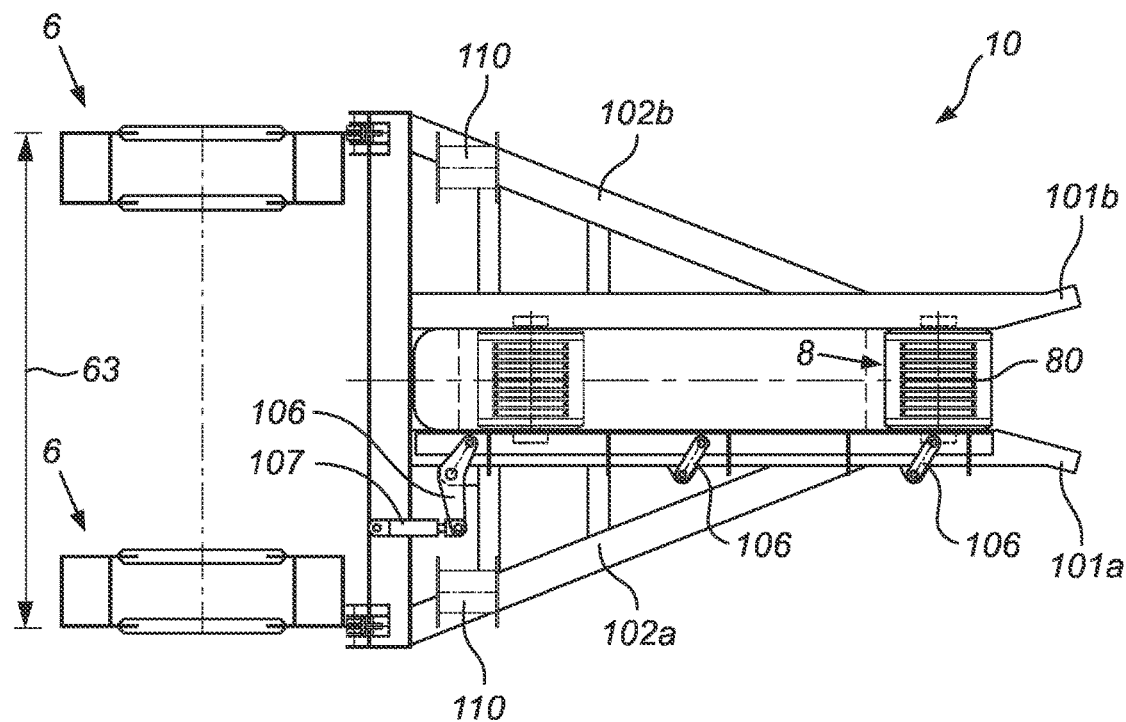
FIGS. 4A, 4B and 4C show respectively a schematic top side view, side view and front view of another embodiment of a guide device according to the invention.
Figure 4B:
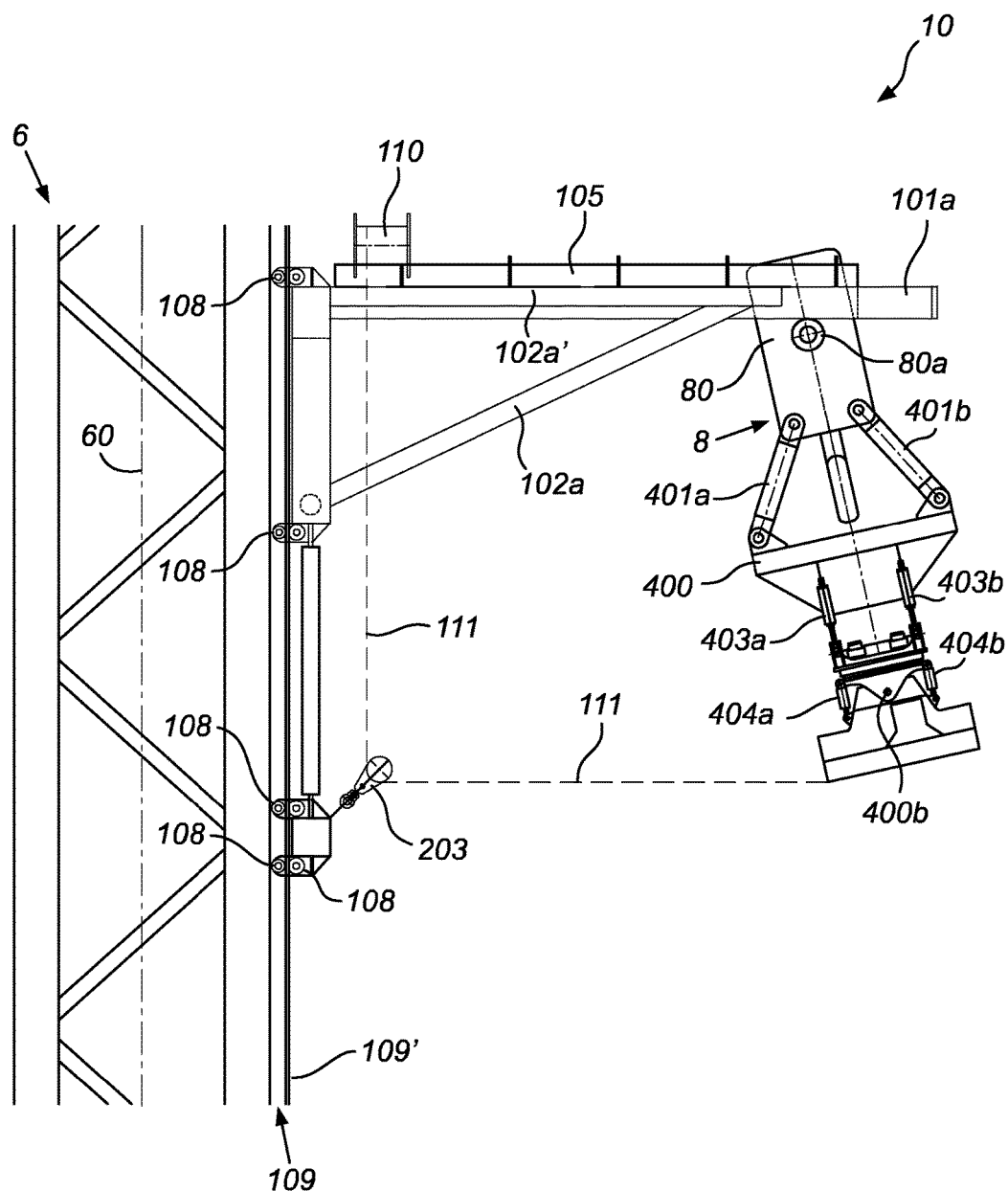
Figure 4C:
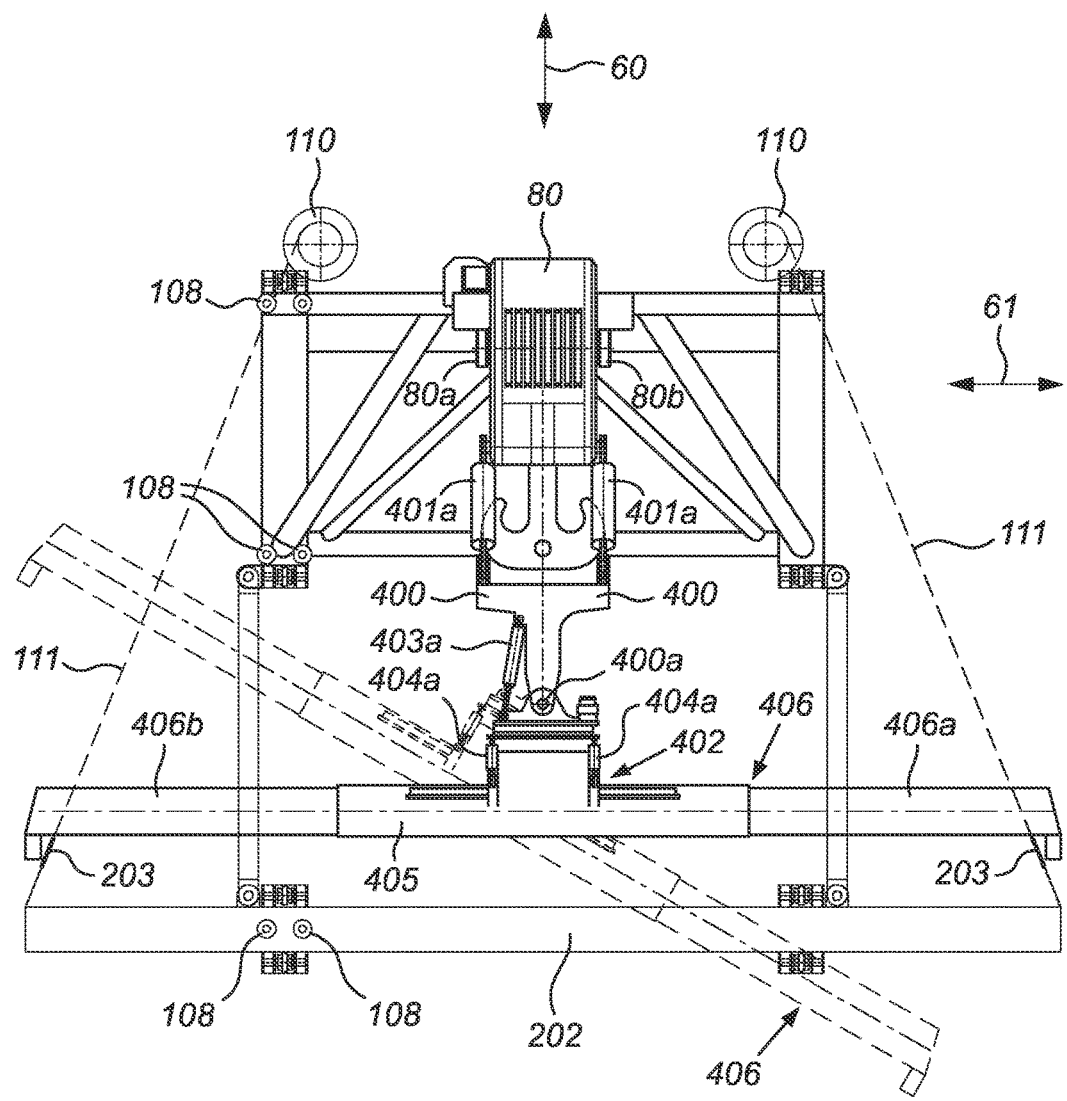
Figure 5A:
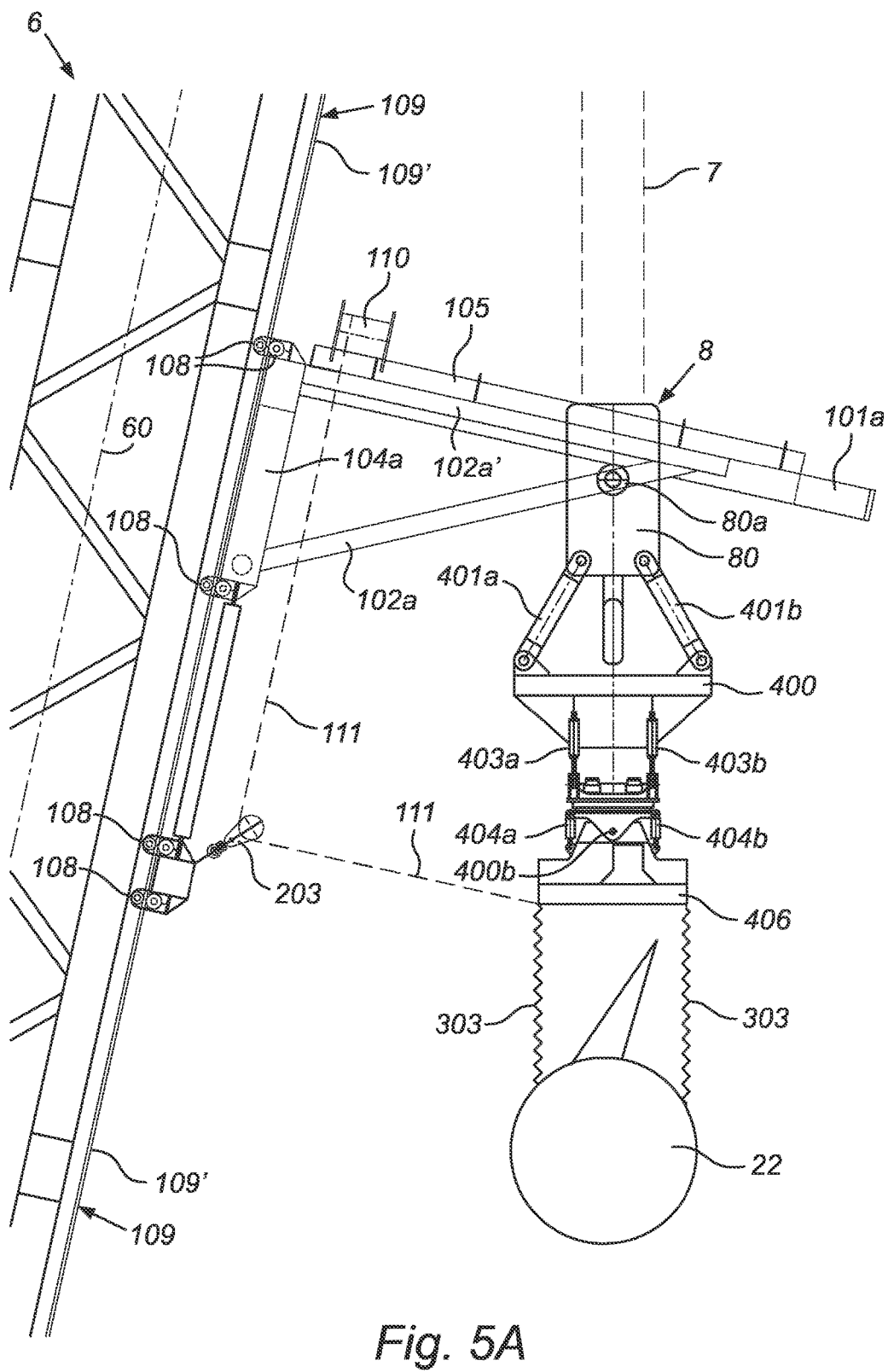
FIGS. 5A and 5B show respectively a schematic side view and front view of yet another embodiment of a guide device according to the invention; and finally
Figure 5B:
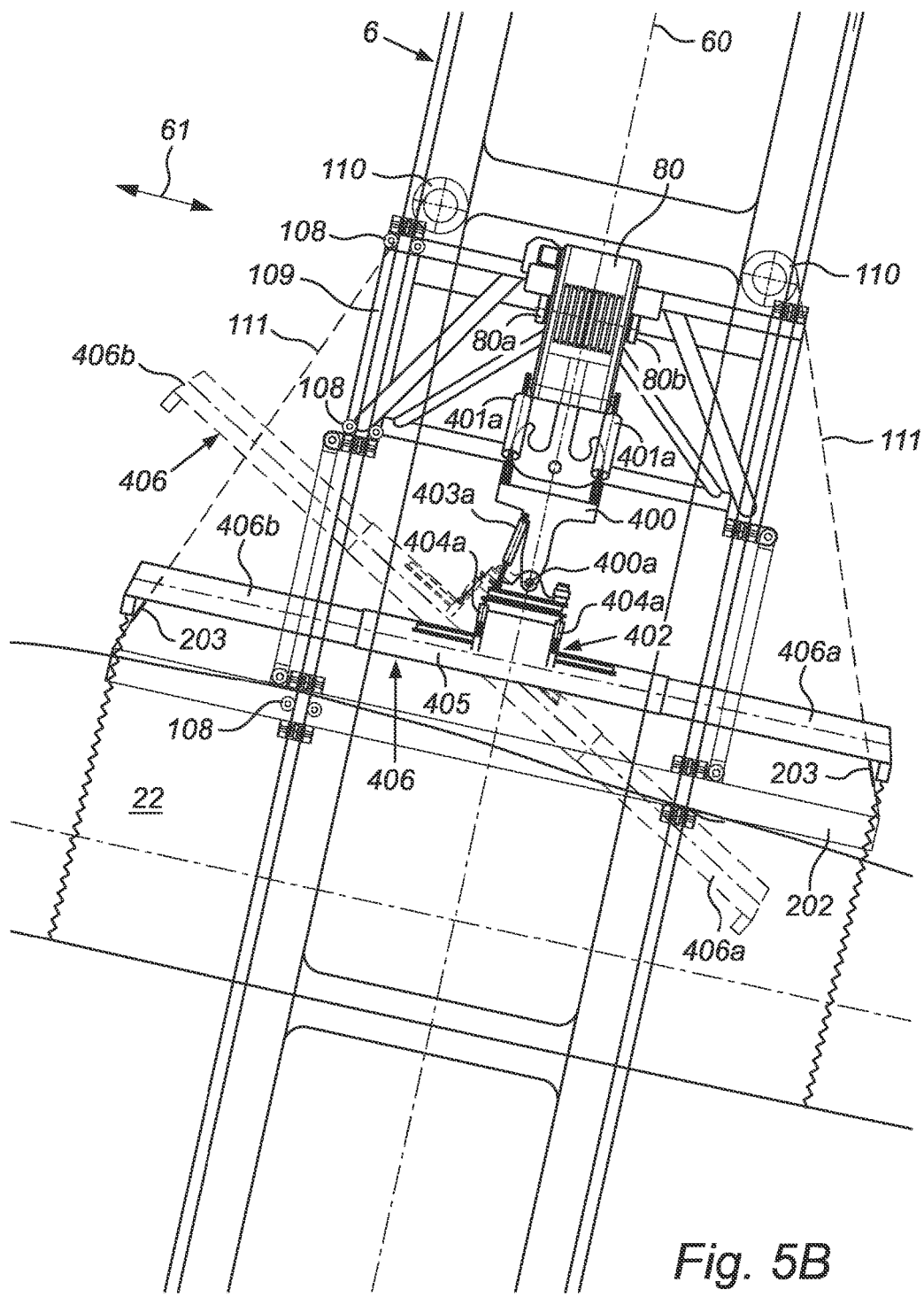

FIGS. 4A, 4B and 4C show an embodiment wherein hoisting pulley 8 is connected by means of a rigid connection to an attaching structure, likewise in the form of for instance a hoisting yoke or rotor blade spreader 406 running in transverse direction 61, to which a wind turbine or rotor blade 22 can be releasably attached, see FIGS. 5A and 5B. The rigid connection comprises a T-shaped bridging construction 400 connected with transverse connections (401a, 401b) to pulley housing 80. Bridging construction 400 bridges the hoisting hook 81. The rotor blade spreader construction 406 is connected thereto for rotation around hinge 400a, the connection in this embodiment forming an actuator 402 to which spreader 406 is connectable or of which it forms part. Actuator 402 is rotatable by means of hydraulic cylinders (403a, 403b) around axis 400a in a transverse direction 61. Actuator 402 and spreader 406 comprise further means for displacing and/or rotating parts of the attaching structure in three dimensions. A part 405 rotatable around a rotation axis 400b running perpendicularly of axis 400a can thus be rotated through the action of hydraulic cylinder 404a and/or 404b. This will likewise rotate the telescopically extendable arms (406a, 406b) of the rotor blade spreader 406. If desired, the length of spreader 406 is increased and adjusted to the component for lifting by extending the arms (406a, 406b).

A rotor blade 22 can be suspended in two slings 303 attached to the spreader, as already described above in an embodiment with a hoisting yoke 400 or 406. The combination of displacing and rotation actuators provides the option of precisely placing a wind turbine blade in a random orientation relative to boom 6, and thus also relative to support structure 3 and so also relative to a nacelle 21 mounted on mast 2.

It will be apparent that power supply means (not shown) such as batteries, motors, pumps and the like are present for the purpose of operating the different components of guide device 10, such as for instance the tugger winches and the hydraulic cylinders. It is also possible to place these provisions wholly or partially on crane structure 5, wherein the hydraulic hoses, electrical and mechanical cables and the like required for the purpose of actuating the components are run along the boom to guide device 10. The power supply means are however preferably provided on guide device 10 itself, and the required energy is carried via a so-called umbilical hoisting cable to guide device 10. An umbilical hoisting cable comprises a steel cable, the core of which comprises not a strand but for instance an electrical power supply cable. Energy can in this way be carried easily to guide device 10 via for instance slide rings in the hoisting winch drum. Power supply to the diverse actuators on the rotor blade spreader is provided most easily by electrical or hydraulic accumulators on the spreader itself. The operation of the diverse functions is performed most easily using radio remote control.

FIGS. 1A-1B illustrate the placing of a nacelle 21 on a wind turbine mast 2 with a method according to the invention. The method comprises of providing a device 1 according to the invention on a vessel 4 and placing a component from vessel 4 onto a support structure 3 present at sea using lifting means 5, wherein the movement of hoisting tackle 8 is temporarily limited in at least one direction by guide device 10 by means of displacing the displacing device (108, 109, tensioning cable) from the highest position in the boom along longitudinal axis 60 of boom 6 to the position of hoisting tackle 8. After guide device 10 has come into contact with wheels 80a of hoisting tackle 8, the hoisting winch of guide device 10 is set into constant tension operation. During lifting and paying out of hoisting tackle 8 the guide device 10 therefore continues to follow hoisting tackle 8 passively because the guide device rests while applying little weight on the wheels (80a, 80b) of hoisting tackle 8. In this situation the transverse movement of hoisting tackle 8 in direction 61 is prevented by beams 101a, 101b. When boom 6 is at the right angle to be able to reach the centre line of support structure 3, the movement of hoisting tackle 8 relative to guide device 10 is preferably substantially prevented by clamping the hoisting tackle 8 in the clamping device (105, 106, 107) of guide device 10.

Nacelle 21 is connected with a usual hoisting yoke and hoisting cables (slings) to hoisting tackle 8. The method according to the shown embodiment comprises the steps, among others, of taking up nacelle 21 from work deck 41 of vessel 4 to a first position A using hoisting tackle 8, wherein guide device 10 is held in a high position of boom 6 so that hoisting tackle 8 can move freely and boom 6 acts as a boom 6 of a known crane. Hoisting tackle 8 can hereby move in simple manner on and along work deck 41, for instance in storage racks for the components, without this movement being impeded by guide and clamping devices mounted on boom 6. Boom 6 is then tilted upward around rotation shaft 6a (luffed in) until it runs so steeply that hoisting cable 7 of hoisting tackle 8 comes within reach of guide device 10 (in a direction transversely of boom 6). Guide device 10 is then displaced along the longitudinal axis 60 of boom 6 roughly to the position of hoisting tackle 8, wherein guide device 10 rests on the wheels (80a, 80b) of hoisting tackle 8, after which the hoisting winch (not shown) of guide device 10 is set into constant tension operation so that guide device 10 passively follows the displacements of boom 6 and hoisting tackle 8. Nacelle 21 is then hoisted from a position A to a position B, wherein guide device 10 passively follows the movement of hoisting tackle 8. Boom 6 is subsequently pivoted around rotation axis 51 to a position in the vicinity of the desired assembly position (see FIG. 1B). Hoisting tackle 8 is fixedly clamped with guide device 10 in the manner described above in detail, and boom 6 is tilted until nacelle 21 is situated in the desired assembly position. Hoisting tackle 8 is released from the guide device by unlocking the clamping device (105, 106, 107) and nacelle 21 is lowered to a position against or on the already present support structure 3 or other already placed components. This latter step preferably comprises of displacing and/or rotating in three dimensions any of the attaching structures and/or parts of attaching structures described above in detail.

The above described operations are repeated as often as components have to be placed.

The invention is not limited to the embodiments shown in the figures, and many variants thereof are possible within the scope of protection of the appended claims. It is thus possible for instance to place rotor blades 22 individually or, conversely, to mount one or more rotor blades 22 on the hub or nacelle 21 (for instance in so-called bunny form) and to place the whole on support structure 3 using the described device and method.

The invention claimed is:

1. A device for assembling a structure constructed from components, for a wind turbine, which device comprises a lifting means placed on a surface for the purpose of placing a component on an available support structure, wherein a boom of the lifting means is provided with a main hoisting cable which is provided on a free outer end thereof with an attaching means for releasable attachment of the component for lifting to the main hoisting cable of the boom, wherein the boom further comprises a guide device for the attaching means, wherein the guide device is connected to the boom for displacement along a longitudinal axis of the boom by means of a displacing device, and which the guide device is configured for coupling to the attaching means so that the attaching means, when contacting the guide device, is constrained to move only in a plane comprising the longitudinal axis of the boom and a centerline of the guide device, while being constrained in a transverse direction perpendicular to said plane.

2. The device as claimed in claim 1, wherein the guide device comprises a frame of mutually connected beams, of which at least one beam extends from the boom, from a main beam running in a transverse direction of the boom, in the direction of the attaching means and can hold the attaching means at least partially in place.

3. The device as claimed in claim 2, wherein the at least one beam extends substantially perpendicularly of the longitudinal axis of the boom.

4. The device as claimed in claim 2, wherein the at least one beam extends from the boom over a perpendicular distance of a maximum of twice the boom width.

5. The device as claimed in claim 2, wherein at least two beams of the frame extend from the boom in the direction of the attaching means and can at least partially enclose the attaching means.

6. The device as claimed in claim 1, wherein the attaching means is connected by means of a rigid or flexible connection to an attaching structure to which the component can be releasably attached.

7. The device as claimed in claim 6, wherein the rigid or flexible connection and/or the attaching structure comprises means for displacing and/or rotating respectively the attaching structure and/or parts of the attaching structure in three dimensions.

8. The device as claimed in claim 6, wherein the attaching structure comprises a yoke.

9. The device as claimed in claim 6, wherein the attaching structure comprises a rotor blade spreader.

10. The device as claimed in claim 1, further including a co-acting means for coupling the guide device to the attaching means.

11. The device as claimed in claim 10, wherein the co-acting coupling means comprise wheels which are provided on the attaching means and on which the guide device can rest while applying little force.

12. The device as claimed in claim 10, wherein the co-acting coupling means comprise cables running between the attaching means and the guide device.

13. The device as claimed in claim 1, wherein the displacing device is configured for the guide device to follow the displacement of the attaching means.

14. The device as claimed in claim 13, wherein the displacing device comprises a tensioning cable attached to the guide device and operated by a constant tension winch so that a tensile force in the tensioning cable remains substantially constant.

15. The device as claimed in claim 1, wherein the guide device is configured for coupling to the attaching means so that the movement of the attaching means is limited in directions other than a direction of a longitudinal axis of a free-hanging main hoisting cable.

16. The device as claimed in claim 1, wherein the guide device is configured for coupling to the attaching means so that movement of the attaching means is limited over a predetermined distance.

17. The device as claimed in claim 1, wherein the guide device comprises a clamping device for the attaching means whereby the movement of the attaching means relative to the guide device is substantially prevented.

18. The device as claimed in claim 1, wherein a clamping device is formed by at least one clamping beam which is mounted on the guide device and which is displaceable toward the attaching means to a clamping position of the attaching means.

19. The device as claimed in claim 1, wherein the guide device comprises auxiliary devices.

20. The device as claimed in claim 1, wherein the surface comprises a vessel.

21. A method for assembling a large structure constructed from components, for a wind turbine, which method comprises the steps of (a) providing a device as claimed in claim 1 on a surface and (b) placing the components on an available support structure using the lifting means, wherein the attaching means is constrained to move only in a plane comprising the longitudinal axis of the boom and the centreline of the guide device, while being constrained in a transverse direction perpendicular to said plane by the guide device by means of displacing the displacing device along the longitudinal axis of the boom to the position of the attaching means.

22. The method as claimed in claim 21, further comprising the steps of:
c) taking up a component with the attaching means;
d) tilting the boom upward until it runs so steeply that the attaching means comes within reach of the guide device;
e) displacing the guide device along the longitudinal axis of the boom until it rests on the wheels of the attaching means, after which the hoisting winch of the guide device is then set to constant tension operation so that the guide device passively follows the displacements of boom and attaching means;
f) pivoting the boom into the vicinity of the desired assembly position;
g) fixedly clamping the attaching means with the guide device;
h) tilting the boom until the component is in the desired assembly position;
i) wholly or partially unclamping the attaching means; and
j) lowering the component into the desired assembly position.

23. The method as claimed in claim 22, wherein the lowering of the component into the desired assembly position in step j) comprises displacing and/or rotating the attaching structure and/or parts of the attaching structure in three dimensions.

24. The method as claimed in claim 21, wherein the components comprise the mast sections, the rotor blades and/or the nacelle of a wind turbine.

25. The method as claimed in claim 24, wherein the components comprise the nacelle with hub of a wind turbine, wherein the hub is provided with rotor blades.

26. The method as claimed in claim 21, wherein the movement of the attaching means relative to the guide device is substantially prevented by clamping the attaching means in the clamping device.

27. The method as claimed in claim 21, wherein the guide device is displaced with a substantially constant tensile force by means of a tensioning cable attached thereto along the longitudinal axis of the boom.

28. The method as claimed in claim 21, wherein the surface comprises a vessel and the components are placed on a support structure present at sea.

* * * * *